(12) United States Patent
Dudek et al.

(10) Patent No.: US 6,491,193 B2
(45) Date of Patent: Dec. 10, 2002

(54) MOTORCYCLE LUGGAGE ACCESSORY

(75) Inventors: Janusz Dudek, Toronto (CA);
Zbigniew Szemplinski, 946 Scarlett Road, Toronto, Ontario (CA), M9P 2V6

(73) Assignee: Zbigniew Szemplinski, Toronto (CA)

(*) Notice: Subject to any disclaimer, the term of this patent is extended or adjusted under 35 U.S.C. 154(b) by 50 days.

(21) Appl. No.: 09/838,304

(22) Filed: Apr. 20, 2001

(65) Prior Publication Data

US 2002/0153398 A1 Oct. 24, 2002

(51) Int. Cl.[7] ................................ B62J 11/00
(52) U.S. Cl. ................ 224/435; 224/413; 190/20; 190/107
(58) Field of Search ................ 224/435, 413, 224/412, 401, 417, 419, 425, 439, 440, 488, 493, 527, 328; 190/107, 100, 20

(56) References Cited

U.S. PATENT DOCUMENTS

| | | | | |
|---|---|---|---|---|
| 34,777 A | * | 3/1862 | Roultone | 190/20 |
| 140,548 A | * | 7/1873 | Scott | 190/20 |
| 394,994 A | * | 12/1888 | Pokiwka | 190/20 |
| 508,057 A | * | 11/1893 | Strechhan | 190/20 |
| 3,813,018 A | | 5/1974 | Heltzen | |
| 4,125,213 A | | 11/1978 | Watkins | |
| 4,447,088 A | | 5/1984 | Bodlovic | |
| 4,588,114 A | | 5/1986 | Lebaron et al. | |
| 4,809,891 A | | 3/1989 | Patrin | |
| 4,921,151 A | * | 5/1990 | Duvall | 190/125 |
| 5,405,068 A | * | 4/1995 | Lovett | 224/153 |
| 5,743,452 A | * | 4/1998 | Liu | 224/275 |
| 6,123,239 A | | 9/2000 | Lovitt | |

OTHER PUBLICATIONS

Aldrich, Pub. No.: US 2002/0053583 A1, May 9, 2002.*

* cited by examiner

Primary Examiner—Stephen P. Garbe
Assistant Examiner—Lien Ngo
(74) Attorney, Agent, or Firm—Ridout & Maybee LLP

(57) ABSTRACT

A motorcycle luggage accessory and method for making thereof is disclosed which provides lumbar support and is removably secured longitudinally, laterally, and vertically to the back of a motorcycle. This device does not require engaging a backrest.

19 Claims, 4 Drawing Sheets

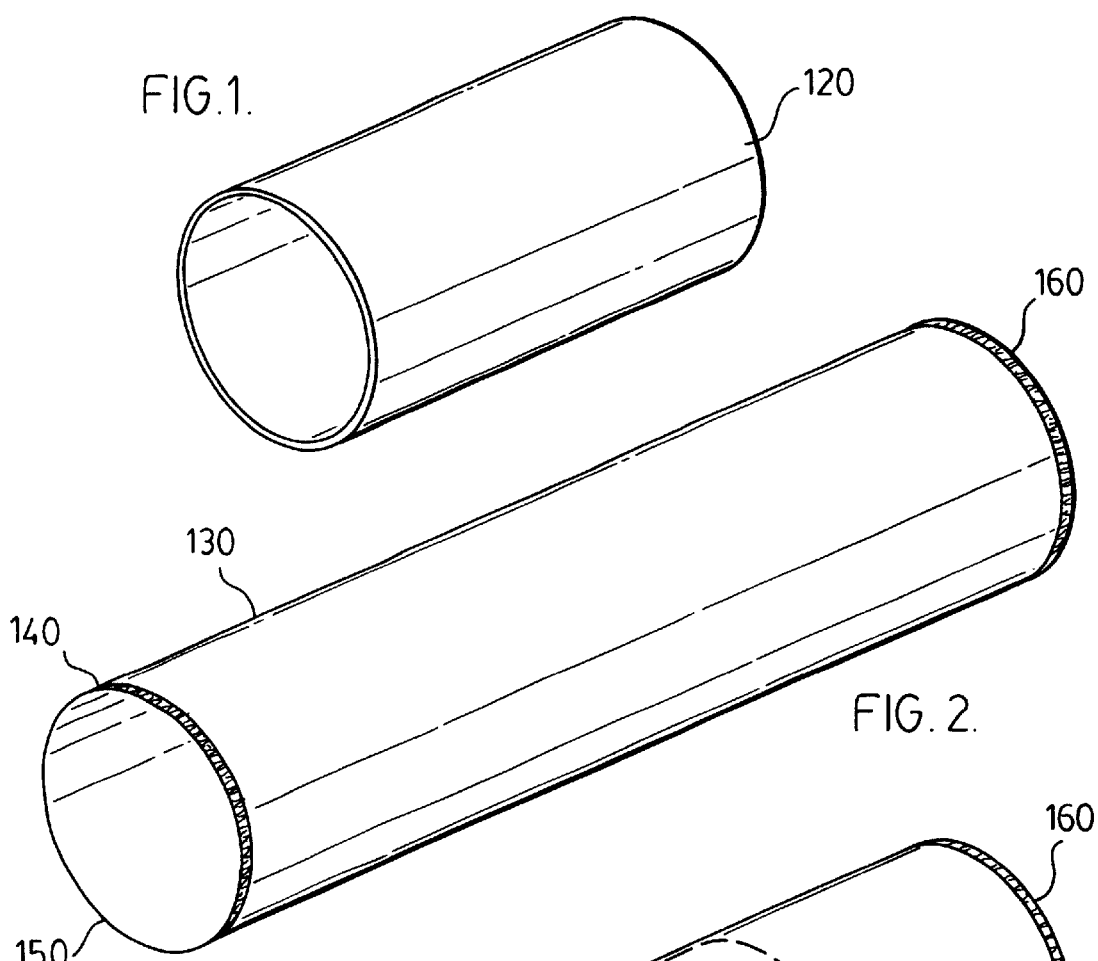
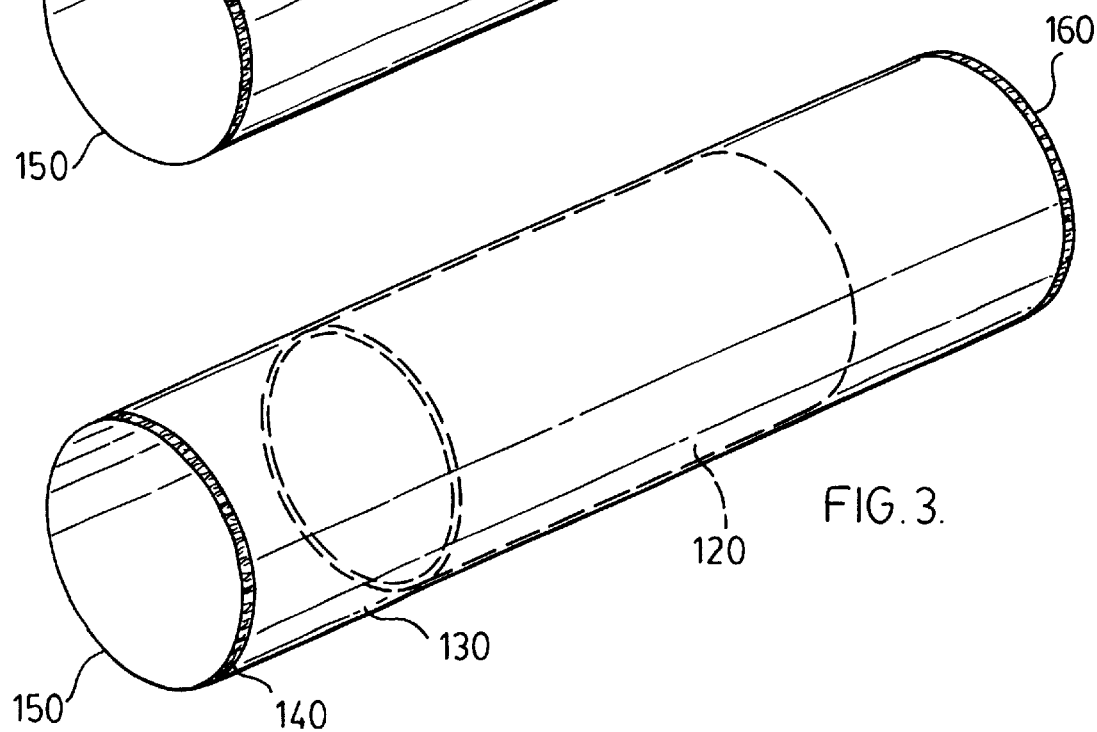

MOTORCYCLE LUGGAGE ACCESSORY

BACKGROUND

1. Field of Invention

The invention is a luggage accessory for a motorcycle that provides a back support for the rider, and which is removably attachable to a rear frame of a motorcycle.

2. Description of Related Art

Many types of luggage accessories for use in association with motorcycles are known. Some such accessories are rigid clamshell structures attachable to a rack at the rear of the motorcycle, and other luggage accessories are soft bags which are secured by straps to frame members at the rear of the motorcycle. While such prior luggage accessories provide suitable means for storage, they are generally attached to the motorcycle in a way which does not facilitate their use as a backrest for the rider. Any such accessories which may be configured as a backrest for the rider only can function as a backrest when full.

U.S. Pat. No. 6,123,239 (Lovitt) discloses a bag with straps which loop around the seat back of a motorcycle. The seat back engaging loops provide lateral stability for the luggage. The bag of this invention is soft and provides no inherent structure for a backrest.

SUMMARY OF THE INVENTION

The present invention has the desirable feature of providing a backrest for the motorcycle rider as well as providing a means for storing personal effects. The invention is a rigid structure which is preferably tubular so as to provide a natural support to the rider's lumbar region. The invention may be secured to the seat support frame of the motorcycle or other rear motorcycle frame members, and is normally positioned in front of the passenger seat back. The accessory of the invention is preferably held in place by means of straps. When there are two riders on the motorcycle, the accessory can be secured to support frame members behind the passenger seat back.

The invention comprises a rigid support such as a tube which is covered by a material such as a synthetic leather. The rigid support for the luggage accessory enables the accessory to serve as a backrest even when it is empty. In a preferred embodiment, the accessory has an attachable backrest member which is adjustable to the preference of the rider.

Each end of the luggage accessory is provided with an endcap which maybe completely removed to provide easy access to the interior of the luggage.

The invention has the desirability of providing the motorcycle rider with a detachable accessory which functions as a backrest. The accessory of the invention has a rigid hollow support with opposing open ends, and a cover is releasably engageable about the support. A plurality of straps are attached to the rigid hollow support for the purpose of engaging the seat support frame so that the accessory may be secured to it. The secured luggage accessory may be positioned to provide a backrest for a rider of the motorcycle. The accessory has endcaps which are releasably attachable to the opposing open ends of the covered support. The invention disclosed herein provides for lumbar support for the motorcycle rider while the luggage is empty and does not require the mounting of additional support structure to the motorcycle.

BRIEF DESCRIPTION OF DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective side view of the rigid hollow support;

FIG. 2 is a perspective side view of the cover and closing means;

FIG. 3 is a cross sectional view of the rigid hollow support inserted and centered within the cover, and closing means are also illustrated;

DETAILED DESCRIPTION OF PREFERRED EMBODIMENTS

Figure 4:
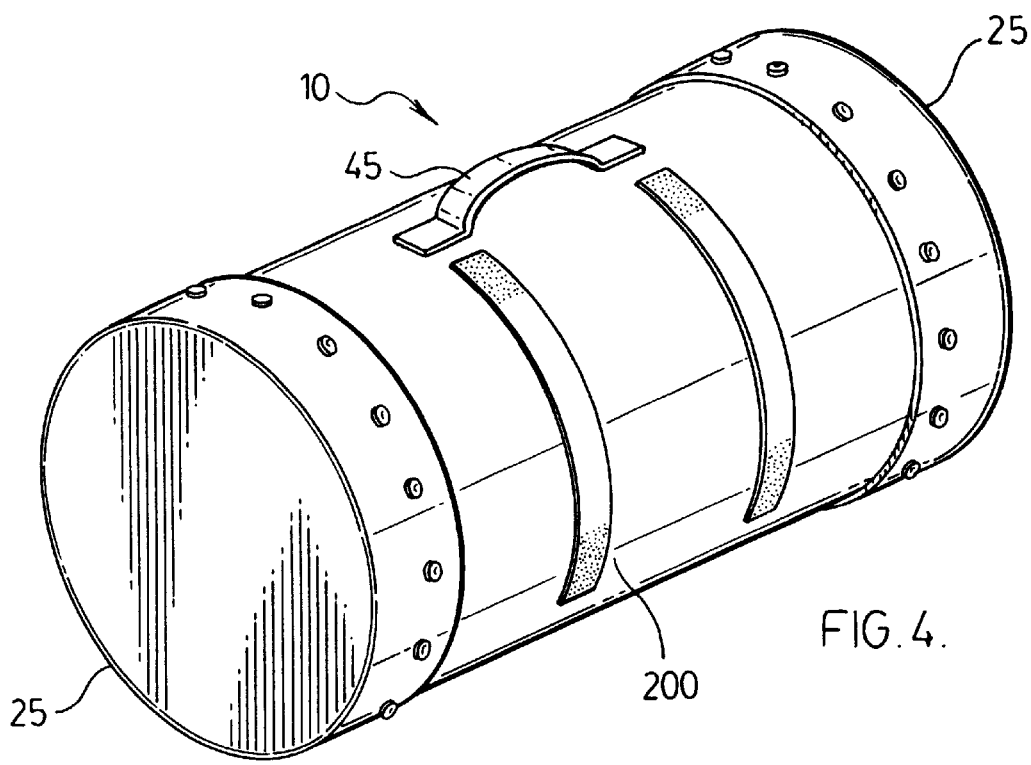
FIG. 4 is a perspective side view of a fully assembled motorcycle luggage accessory comprising the rigid hollow support centered within the cover, and the two ends of the cover joined together by the closing means.

The following description is provided to enable any person skilled in the art to make and use the invention and sets forth the best modes, contemplated by the inventor, for carrying out his invention. Various modifications, however, will remain readily apparent to those skilled in the art. The generic principles of the present invention have been defined herein specifically to provide a removably engageable motorcycle luggage accessory which provides a backrest for the motorcyclist as well as a means for storing personal effects.

The accessory is both rigid and cylindrical. The accessory may be mounted either behind or on top of the motorcycle seat. This dual positioning feature allows the accessory to provide lumbar support to a motorcyclist. The accessory, being rigid, can provide lumbar support even while empty.

The motorcycle luggage accessory is securable to the rear frame portion of the motorcycle by strap means and attachment means.

FIG. 1 is a perspective side view of the rigid hollow support 120. This figure illustrates the rigid hollow support 120 used to make the accessory 10 rigid. In one preferred embodiment, the rigid hollow support 120 is a PVC pipe. In another preferred embodiment the rigid hollow support 120 has an outer diameter of 12.75 inches. In yet another preferred embodiment the rigid hollow support 120 has an outer diameter of 16.0 inches.

FIG. 2 is a perspective side view of the cover 130 and closing means 140. The cover 130 may be constructed out of a durable weather resistant material. The cover 130 encompass the rigid hollow support 120 and protects it and its contents from the environment. The cover 130 has a first end 150 and the second end 160. The cover 130 has a length that is double that of the rigid hollow support 120. The cover 130 also serves to give the accessory, 10 an aesthetically appealing appearance. The closing means 140 are well known in the art and may comprise, but not limited to, zippers or Velcro. In one embodiment the cover 130 is made of a leather. In another embodiment the cover 130 is made of a synthetic leather.

FIG. 3 is a cross sectional view of the rigid hollow support 120 inserted and centered within the cover 130. The rigid hollow support 120 is inserted in the cover 130 until both are centered around a common midpoint. The first end 150 and the second end 160 of cover 130 are then inserted into the rigid hollow support 120. The first end 150 and the second end 160 are then joined together by the closing means 140 inside the rigid hollow support 120.

The preferred method of manufacture requires that both the rigid hollow support 120 and the cover 130 share a common midpoint but this is not an essential element of the invention as it would be obvious to anyone skilled in the art that the luggage could easily be constructed even if the rigid hollow support 120 was not centered within the cover 130.

FIG. 4 is a cross sectional view of a fully assembled accessory 10. The accessory 10 comprising the rigid hollow support 120 centered within the cover 130. The first end 150 and the second end 160 of the cover 130 are joined together by the closing means 140 inside the rigid hollow support 120.

Figure 5:
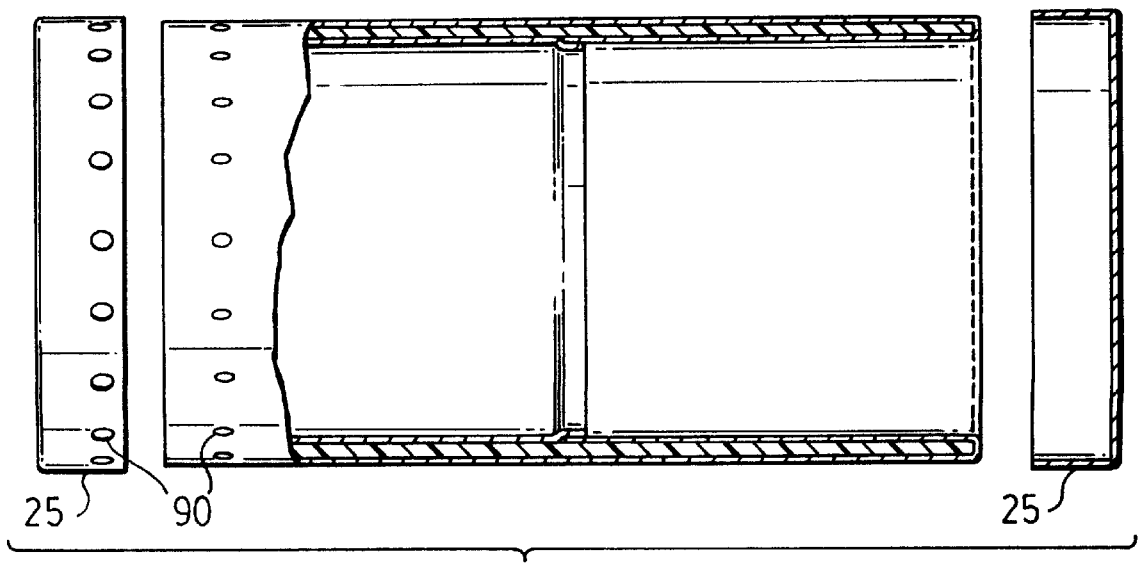
FIG. 5 is a perspective side and partial cross-sectional view of the motorcycle luggage accessory, illustrating the handle and removable endcaps.

FIG. 5 is a perspective side and partial cross-sectional view of the accessory 10. This figure illustrates the accessory 10, in a standalone mode, ready for transporting items. The strap means 30 may be used as a shoulder strap to aid in the manual transportation of the accessory 10.

Figure 6:
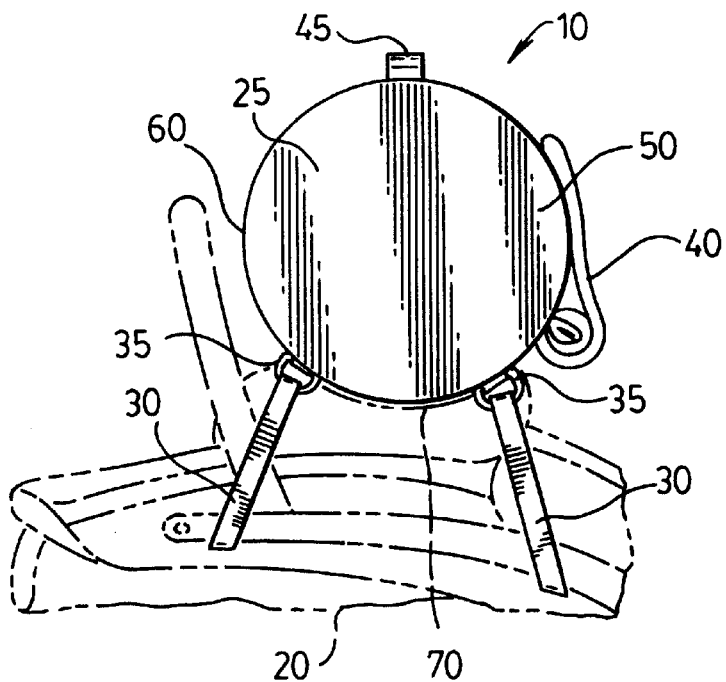
FIG. 6 is a side view of the motorcycle luggage accessory secured to a rear-portion of a motorcycle, illustrating two strap means (strap) and a removably mounted backrest.

FIG. 6 shows an accessory 10, secured to a rear-portion of a motorcycle 20, illustrating an endcap 25, two strap means 30, attachment means 35, a removably mounted backrest 40, and a handle 45. The accessory 10 having a front-facing portion 50 and a rear-facing portion 60. The accessory 10 is rigid, cylindrical in shape and constructed of a durable weather resistant material. The interior of accessory 10 is accessible by removing either one of the two endcaps 25. The accessory 10 may be carried by the handle 45.

The attachment means 35 may comprise metal loops or hooks but it would be obvious to someone skilled in the art that mechanical equivalents may be substituted to achieve the same results. The strap means 30 may comprise a strap or cord constructed of a durable, wear resistant material. The strap means 30 would include a means for adjusting the length and tension of the strap. The strap means 30 would also include a means for securing the strap and locking it into place. The means for adjusting and the means for securing may be the same means. Such means for adjusting the length and securing the strap are well known in the art and do not form an essential feature of this invention.

The strap means 30 secures the accessory 10, via the attachment means 35, to the rear-portion of the motorcycle 20. The strap means 30 engages both the attachment means 35 and the rear-portion of the motorcycle 20 in several physically spaced apart locations. The strap means 30 is tensioned at an angle between the attachment means 35 and the rear-portion 20, thereby providing stability in all three dimensions.

The attachment means 35 are located on the bottom portion 70 of the accessory 10. At least three attachment means 35 are located on the bottom portion 70 of the accessory 10, in a triangular orientation.

In another embodiment four attachment means 35 are located on the bottom portion 70 of the accessory 10, two being located adjacent to the front-facing portion 50 and two being located adjacent to the rear-facing portion 60.

In another embodiment, the removably mounted backrest 40 is mounted to the accessory 10 with Velcro™ (hook and loop fasteners).

The removably mounted backrest 40 is an optional feature of this invention as the motorcycle luggage accessory itself may act as a backrest.

Figure 7:
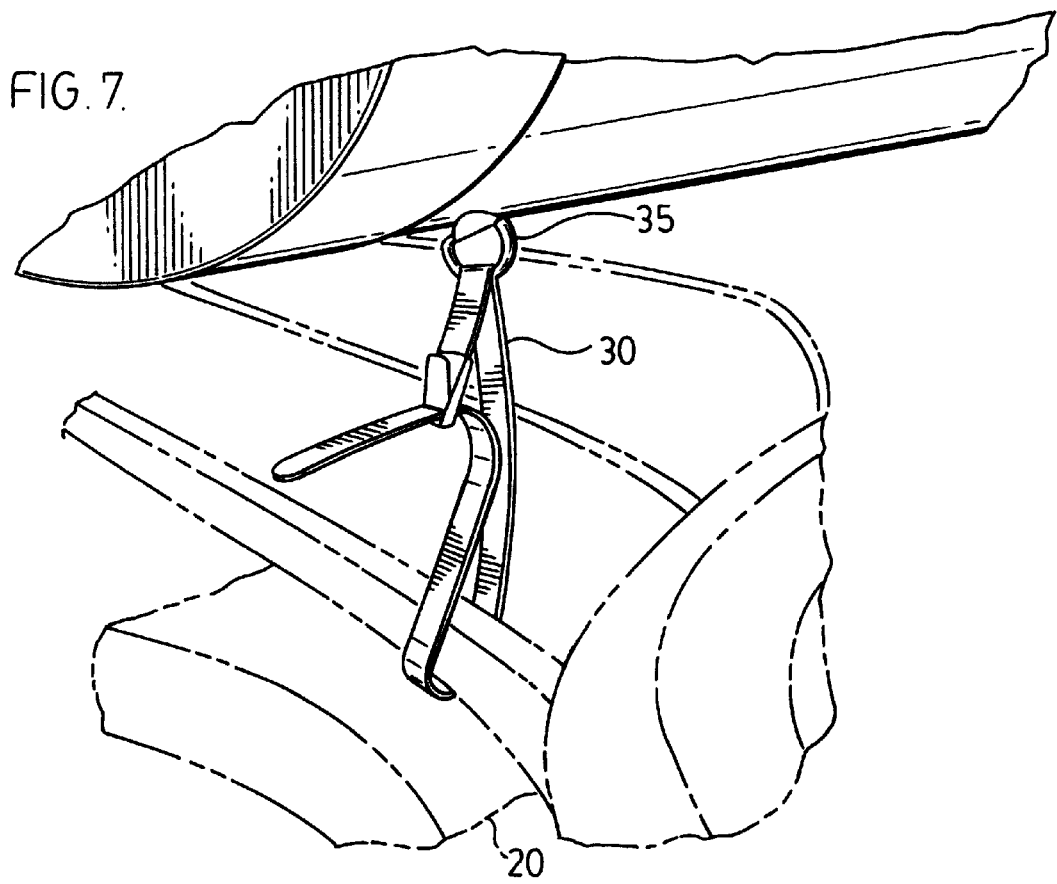
FIG. 7 is an enlarged view of a single strap means (a single strap), and an attachment means (a metal loop)

FIG. 7 shows an enlarged view of a single strap means 30 and an attachment means 35. A single strap means 30 of sufficient length may be used to engage all of the attachment means 35. In another embodiment each strap means 30 may correspond to a unique attachment means 35.

Figure 8:
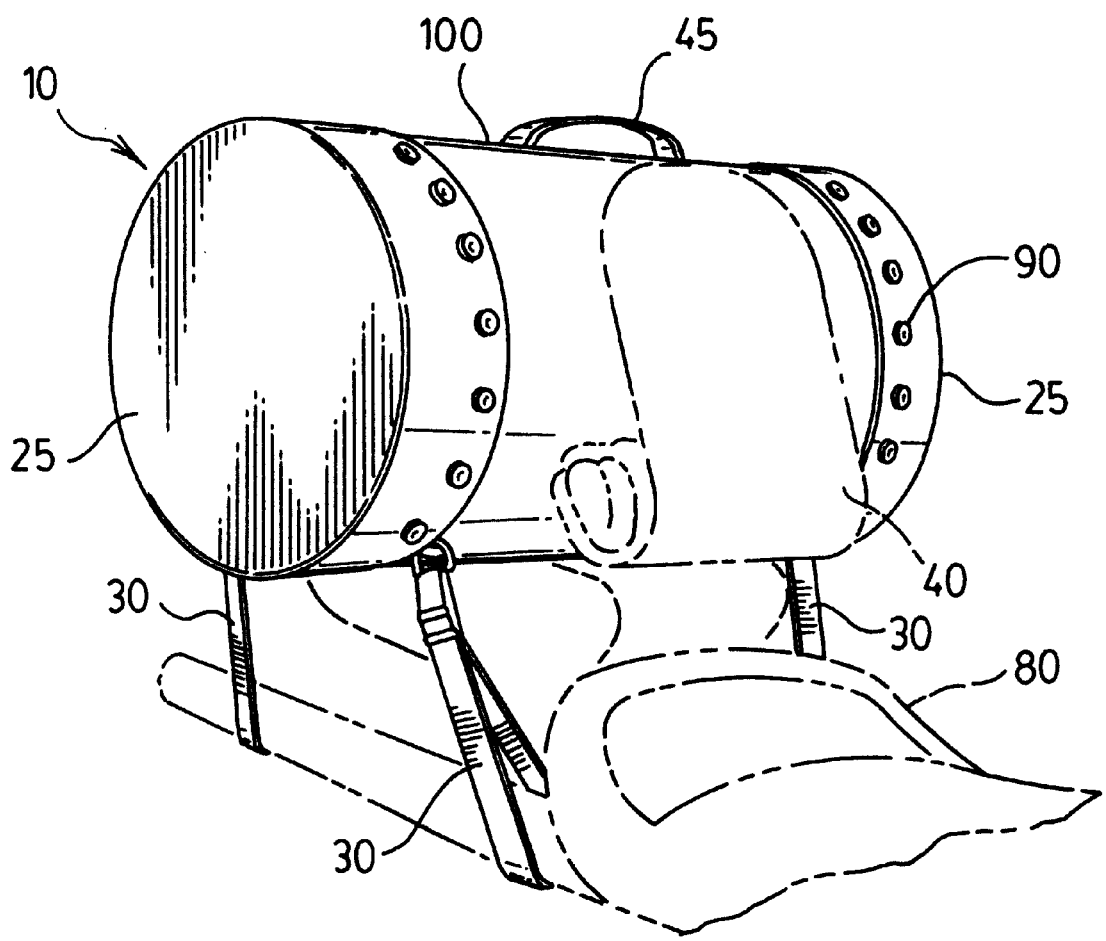
FIG. 8 is a perspective side view of the motorcycle luggage accessory secured to the rear-portion of the motorcycle (behind a backrest), illustrated are two strap means and a removably attached backrest.

FIG. 8 shows a removably mounted backrest 40 attached to the accessory 10 with Velcro (hook and loop fasteners). The backrest 40 provides additional lumbar support for a motorcyclist, when mounted on or behind the motorcycle seat 80. When a passenger is seated behind the motorcyclist, the accessory 10 is preferably mounted on a luggage rack (not shown) to the rear of seat 80.

The endcaps 25 are also illustrated in this figure as are the snap means 90 which secure the endcaps 25 to the central luggage body 100. The endcaps 25 provide access to the inside of the accessory 10. Either one or both endcaps 25 may be removed by disengaging the snap means 90. In another embodiment, the accessory 10 may be manufactured with only one removable endcap 25. The snap means 90 are well known in the art and may comprise, but not limited to, metal snaps.

This figure also illustrates three strap means 30 which are angled and tensioned to provide three dimensional stability to the accessory 10.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A motorcycle luggage accessory attachable to a rear-frame portion of a motorcycle, said accessory comprising:

a rigid hollow support having open ends;

a cover releasably engageable about the rigid hollow support;

a plurality of straps attached to the rigid hollow support and being sized to engage the rear-frame portion so that the accessory may be secured to it, thereby providing a backrest for a rider of the motorcycle; and endcaps releasably attachable to the open ends of the covered support.

2. The motorcycle luggage accessory of claim 1, wherein the rigid hollow support further comprises a backrest removably attached to said rigid hollow support.

3. The motorcycle luggage accessory of claim 2, wherein said backrest is removably attached to said rigid hollow support by hook and loop fasteners.

4. The motorcycle luggage accessory of claim 1, wherein the rigid hollow support has at least one endcap, for allowing access to the luggage.

5. The motorcycle luggage accessory of claim 1, wherein the rigid hollow support has two endcaps, for allowing access to the interior of the rigid hollow support.

6. The motorcycle luggage accessory of claim 4, wherein said endcap is closeable by metal snaps.

7. The motorcycle luggage accessory of claim 5, wherein said endcaps are closeable by metal snaps.

8. The motorcycle luggage accessory of claim 1, wherein the rigid hollow support is cylindrical in shape.

9. The motorcycle luggage accessory of claim 1, wherein the accessory is constructed of a durable weather resistant material.

10. The motorcycle luggage accessory of claim 1, wherein the accessory has a handle.

11. The motorcycle luggage accessory of claim 1, wherein the rigid hollow support further comprises a rigid cylindrical tube.

12. The motorcycle luggage accessory of claim 1, wherein the cover has a first open end and a second open end.

13. The cover of claim 12, wherein the first open end and the second open end further comprise a releasably engagable closing means.

14. The motorcycle luggage accessory of claim 1, wherein the cover is releasably engageable by a zipper.

15. The motorcycle luggage accessory of claim 1, wherein the cover is releasably engageable by Velcro.

16. The motorcycle luggage accessory of claim 1 wherein the rigid hollow support is a PVC pipe.

17. The motorcycle luggage accessory of claim 1, wherein the cover is made of a leather.

18. The motorcycle luggage accessory of claim 1, wherein the cover is made of a synthetic material.

19. A motorcycle luggage accessory attachable to a rear-frame portion of a motorcycle, said accessory comprising:

a rigid hollow support having open ends;

a cover, having a first end and a second end, for covering the rigid hollow support when the rigid hollow support is inserted into the cover;

said cover having a length twice that of the rigid hollow support;

a releasably engagable closing means, attached adjacent to the first and second ends of the cover, for joining the first end to the second end;

a plurality of straps attached to the rigid hollow support and being sized to engage the rear-frame portion so that the accessory may be secured to it, thereby providing a backrest for a rider of the motorcycle; and endcaps releasably attachable to the open ends of the covered support.

* * * * *